United States Patent [19]

Kozicki

[11] Patent Number: 5,500,532
[45] Date of Patent: Mar. 19, 1996

[54] PERSONAL ELECTRONIC DOSIMETER

[75] Inventor: Michael N. Kozicki, Phoenix, Ariz.

[73] Assignee: Arizona Board of Regents, Tempe, Ariz.

[21] Appl. No.: 292,398

[22] Filed: Aug. 18, 1994

[51] Int. Cl.$^6$ .................................................. G01J 1/42
[52] U.S. Cl. ................................ 250/372; 250/336.1
[58] Field of Search ........................... 250/372, 336.1, 250/372 EM

[56] References Cited

U.S. PATENT DOCUMENTS

| | | | |
|---|---|---|---|
| 4,763,011 | 8/1988 | Smith | 250/372 |
| 4,825,084 | 4/1989 | Braunlich et al. | 250/484.1 |
| 5,008,548 | 4/1991 | Gat | 250/372 |
| 5,083,031 | 1/1992 | Hoelsher et al. | 250/484.1 |

FOREIGN PATENT DOCUMENTS

| | | | |
|---|---|---|---|
| 0070430 | 6/1981 | Japan | 250/372 EM |
| 240183 | 10/1986 | Japan | 250/336.1 |

OTHER PUBLICATIONS

"Photodoping of Amorphous Chalcogenides by Metals" By A. V. Kolobov, *Advances in Physics*, vol 40, No. 5, pp. 625–684 (1991).

"Kinetics and Reaction Products of the Photo–induced Solid State Chemical Reaction Between Silver and Amorphous $As_{33} S_{67}$ Layers" By T. Wagner, M. Vlcek, V. Smrcka, P. J. S. Ewen, A. E. Owen, The Department of General & Inorganic Chemistry, University of Chemical Technology, Czech, Republic.

"Photo–induced Structural and Physico–Chemical Changes in Amorphous Chalcogenide Semiconductors" By A. E. Owen, A. P. Firth and P. J. S. Ewen, *Philosophical Magazine B*, vol. 52, No. 3, pp. 347–362 (1985).

"Electrical Properties of Silver–Doped As–S Glasses" By E. Hajto, R. Belford, P. J. S. Ewen and A. E. Owen, The Department of Electrical Engineering, University of Edinburgh, Edinburgh EH9 3JL, Scotland.

"Harmful Effects of Ultraviolet Radiation" By The Counsel on Scientific Affairs, *JAMA*, Jul. 21, 1989, vol. 262, No. 3, pp. 380–384 (1989).

"Dosimeter For Every Dacha" By Gabrial Schoenfeld, *The Bulletin of Atomic Scientist*, Jul./Aug. 1989, pp. 13–15 (1989).

*Primary Examiner*—Carolyn E. Fields
*Attorney, Agent, or Firm*—David G. Rosenbaum

[57] ABSTRACT

A personal electronic ultraviolet dosimeter for measuring exposure to short wavelength electromagnetic radiation. The dosimeter is for personal use to determine cumulative exposure to radiation. Exposure dosage is determined through the photodissolution of a metal-containing film into a chalcogenide glass upon illumination or exposure. This process of photodissolution of a metal-containing film into a chalcogenide glass changes the electrical resistance of the metal-containing film. To determine exposure, the increase in the electrical resistance of the exposed metal-containing film may be measured and in turn related to dosage.

18 Claims, 2 Drawing Sheets $V_{OUT} = (V_{MEAS} - V_{REF})$ AMP

PERSONAL ELECTRONIC DOSIMETER

FIELD OF THE INVENTION

This invention relates to a personal electronic ultraviolet dosimeter for measuring exposure to short wavelength electromagnetic radiation. This personal electronic dosimeter is based on the process of the photodissolution of a metal-containing film into a chalcogenide glass, thereby changing the electrical resistance of the metal-containing film. During the process of photodissolution, the electrical resistance of the exposed metal-containing film is increased and thus may be measured and in turn related to dosage.

BACKGROUND

Electromagnetic radiation is a common concern today due to the believed deleterious effects caused by varying degrees of exposure. This type of radiation is defined as waves of energy, consisting of electric and magnetic fields, vibrating at right angles to the direction of wave propagation. Electromagnetic waves are divided into six basic categories dependent on wavelength. In order of wavelength, longest to shortest, electromagnetic waves are categorized as: (i) radio waves, having a wavelength of $10^5$–$10^{-3}$ meters; (ii) infrared (heat) waves, having a wavelength of $10^{-3}$–$10^{-6}$ meters; (iii) visible light, having a wavelength of $10^{-6}$–$10^{-7}$ meters; (iv) ultraviolet waves, having a wavelength of $10^{-7}$–$10^{-9}$ meters; (v) x-rays, having a wavelength of $10^{-9}$–$10^{-11}$ meters; and (vi) gamma rays, having a wavelength of $10^{-11}$–$10^{-14}$ meters. The most common type of radiation causing concern to humans is in the form of ultraviolet radiation. Ultraviolet rays are known to be produced by the sun and various industrial sources such as arc welding, tanning equipment, ultraviolet lasers and lithography exposure equipment, as well as other various means. Ultraviolet rays are typically categorized according to wavelength and known as UV-A rays, UV-B rays and UV-C rays. UV-A rays range from 315–400 nanometers and are responsible for tanning in humans, skin cancer, eye cataracts, solar retinitis and corneal dystrophies. UV-A rays can also cause erythema, but levels 800–1000 times higher than those of UV-B rays are required. In addition, UV-A rays are known to penetrate deeper than UV-B rays. UV-B rays range from 285–318 nanometers in wavelength and are generally considered to be the greatest cause of skin cancer in humans. UV-B rays are the cause of erythema, sunburn and the greatest factor in much of the dermal-connective tissue destruction found in the photoaging process. UV-C rays range from 200–285 nanometers in wavelength and usually are absorbed prior to reaching earth in the upper atmosphere. In general, human exposure to ultraviolet radiation is characterized by vasodilation and an increase in the volume of blood in the dermis. This increased volume of blood is perceived as a reddening of the skin. Knowledge of the cumulative exposure to ultraviolet radiation would greatly assist in allowing one to avoid the harmful effects of ultraviolet radiation.

Short wavelength electromagnetic radiation of other types is typically found in the form of gamma rays and x-rays. X-rays are a form of electromagnetic radiation, falling between ultraviolet radiation and gamma rays in the electromagnetic spectrum. X-ray radiation is produced by bombarding a solid target with a beam of high energy electrons. X-rays can pass through many forms of matter, and therefore are typically found in medical and industrial practice applications to examine internal structures. Falling at the end of the electromagnetic spectrum, gamma rays are still shorter in wavelength. Gamma rays are a form of radiation emitted during the course of nuclear reactions when an excited atomic nuclei passes to a lower excitation state. Typically, gamma rays are produced in radioactive decay processes. Similar to ultraviolet radiation, both gamma rays and x-rays are responsible for creating many injurious effects to humans upon repetitive exposure.

The measurement of exposure to ultraviolet radiation and other forms of radiation in everyday activities and industrial type work is crucial for the determination of total dosage of exposure which is believed to promote skin cancer and other deleterious effects to the individual. It has been determined that frequent and prolonged exposure to ultraviolet radiation and other forms of radiation over many years will induce cellular changes in the human skin. The knowledge of the total exposure dosage, not the rate of exposure dosage, is most beneficial to the individual.

There are at the present many products on the market which offer exposure protection against believed harmful radiation, generally for protecting against ultraviolet radiation. The most common and commercially available product is in the form of sunscreens, offering various sun protection factors for varying types of skin. The most common sunscreens are in the form of lotions, cremes and oils which are intended to be applied directly to the skin prior to ultraviolet exposure. The incorporation of skin protectants upon exposure is a necessity for simulating actual skin condition and determining an accurate cumulative ultraviolet exposure value.

The photo-induced effect of chalcogenide glasses is considered to be of great technological importance in the pursuit of measuring radiation exposure. Changes which range from a subtle shift in the arrangement of atoms to more substantial physical and chemical rearrangements, have been documented upon exposure to light or radiation. Well known in today's technical works are seven distinguishable photo-induced structural or physico-chemical changes occurring in chalcogenides. Included in these physical and chemical changes are: (i) photo-crystallization, the formation of crystals from an amorphous state upon exposure to light or irradiation; (ii) photo-enhanced dissolution of metals, the dissolving of a thin metallic layer into and through an amorphous film upon exposure to light or irradiation; (iii) photo-polymerization, the process in which light sensitive polymers undergo a spontaneous and permanent change in physical properties upon exposure to light or irradiation; (iv) photo-decomposition, the breakdown of a composition into its constituent parts; (v) photo-induced morphological changes, the change in form and structure which takes place upon exposure to light or irradiation; (vi) photo-vaporization, the photo-oxidation reaction subsequent to thermal evaporation; and (vii) photo-induced changes in atomic structure, the changes induced by light emitted by photon energy. (Owen, A. E., et al., *Philosophical Magazine B*, 1985, 52:3, 347–362.) These changes are classified based on whether they are reversible or irreversible and whether they are basically structural or physico-chemical in type.

There exist today many instruments for measuring exposure to ultraviolet radiation. Many of these instruments are commercially available as patches or devices capable of attachment to clothing. These instruments measure exposure to ultraviolet radiation through the use of gas chromatography, thermoluminescent radiation, substrate layering, oscillation energy and electrical resistance.

U.S. Pat. No. 4,763,011, issued to Smith, illustrates the use of gas chromatography to determine ultraviolet exposure. The Smith patent discloses an ultraviolet radiation actinometer or dosimeter capable of measuring the change in concentration of a reaction product through gas chromatography. The patent teaches an apparatus that depends upon a reaction between a solubilized alkyl disulfide and ultraviolet radiation. The alkyl disulfide is dissolved in a solvent and donates hydrogen atoms upon exposure to ultraviolet radiation to form a stable thiol or disulfide which is then detectable by gas chromatography. The process involves the use of the actinometer or dosimeter, but fails to disclose the process of photodissolution, incorporating the use of a chalcogenide glass, nor the alteration and measurement of an electrical resistance.

U.S. Pat. No. 5,008,548, issued to Gat, discloses a miniature portable battery operated power/energy radiometer appropriate for personal use. It provides both for the measurement of the total energy overtime or overall dosage and for the determination of the direction of maximum radiant ultraviolet power. The instrument contains a radiation sensor, a power meter means for displaying radiation intensity and a dosage meter means for displaying radiation dosage. The controller for the instrument is a microprocessor which processes electrical signals from a photocell using an integrated circuit chip.

Additionally, instruments which utilize the chemical reaction of photo-sensitive materials in a layered form are recognized in the current patent literature. U.S. Pat. No. 4,825,084, issued to Braunlich, et al., discloses a thin layer thermoluminescent radiation dosimeter for use in laser readable dosimetry systems and a method for using said dosimeter. The dosimeter as taught is made of a substrate comprised of a transparent glass or a nonporous ceramic, a phosphor-matrix layer bonded to the substrate with an interconnecting binder, a reflective material coating and a moisture resistant protective envelope. Upon exposure, the electrons contained within the thermoluminescent dosimeter become highly energized and trapped at a higher energy level until allowed to fall back to a lower energy state through additional energy, in the form of heat. This addition of energy releases the trapped electrons in the form of visible light which is termed a luminescent emission. This luminescent emission is the measured product used to determine the dosage of radiation exposure.

U.S. Pat. No. 5,083,031, issued to Hoelsher et al. is a continuation-in-part of the Braunlich patent previously discussed. The Hoelsher patent discloses the use of thin layer substrates. In addition, the patent teaches the use of a memory chip to store calibration and identification information which is used during the reading of the device. Once again, the exposure dosage is determined by the luminescent emission which is read by a stimulating laser beam.

The current patent literature includes various types of personal actinometers and dosimeters. These instruments determine exposure to ultraviolet radiation. Currently, none of these instruments allow for total cumulative exposure to ultraviolet light or irradiation over an extended period of time. The currently available instruments retain data, dependent upon a continuous power supply; however, once the power supply to the device is turned off, the cumulative data is lost. Lacking in the patent literature is a personal electronic ultraviolet dosimeter as described in the present invention which is capable of measuring cumulative ultraviolet radiation exposure, or exposure to radiation of shorter wavelengths, through the irreversible process of the dissolution of a metal into a chalcogenide glass. There exist in the present invention no loss of cumulative data due to its lack of dependence on a constant power source. The dissolution of the metal in the metal-containing film into the chalcogenide results in a decrease in the thickness of the exposed metal-containing film, thereby increasing the electrical resistance of the exposed metal-containing film. This increase in electrical resistance of the metal-containing film is capable of being measured and converted into a cumulative exposure dosage value based on approved dermatologist recommended exposure levels.

There is a need for an instrument capable of recording the actual cumulative exposure to radiation, which can be worn directly on the skin or on or under clothing. The user of the personal electronic dosimeter, when measuring ultraviolet radiation, is able to directly apply an exposure protectant to the portion of the dosimeter which receives and interprets the illumination of ultraviolet rays. Sunblock or protective coatings may be applied directly to the device to simulate actual skin exposure thus enabling the individual to obtain the best assessment of exposure to the radiation. This direct application enables the dosimeter to measure and interpret an accurate cumulative ultraviolet radiation exposure dosage value.

The current invention relates to a device which measures exposure to radiation in the form of ultraviolet radiation or other forms of short wavelength electromagnetic radiation. Exposure dosage is determined through the photodissolution of a metal-containing film into a chalcogenide glass upon illumination or exposure. Photodissolution is defined as the process that takes place upon exposure to light or irradiation of the correct wavelength, thus causing a metal from a metal-containing film to become dissolved into a chalcogenide glass. Specific metals and chalcogenides may be used dependent on the specific radiation wavelength of which exposure is sought to be measured and to reduce the effects of thermal diffusion upon exposure. During photodissolution, exposure to radiation causes the metal of the metal-containing film to rapidly dissolve into the chalcogenide and migrate through the chalcogenide. Exposure in the form of vertical illumination will cause the metal in the metal-containing film to migrate vertically with minimal lateral movement. The radiation exposure which takes place causes an increase in the electrical resistance of the exposed metal-containing film by thinning the film layer. The electrical resistance of the metal-containing film is subsequently measured to determine the change in electrical resistance which occurred between the exposed portion and the shielded, unexposed, portion of the metal-containing film. The actual exposure to ultraviolet light or irradiation is determined by the change in electrical resistance. The dissolution effect which takes place is irreversible thus, the cumulative dosage information cannot be lost. The means for measuring the change in electrical resistance can be a simple differential amplifier integrated circuit which measures the difference in electrical resistance between the light and dark effects of the metal-containing film. The light and dark effects are created by exposing one portion of the metal-containing film to some form of radiation while shielding another portion of the metal-containing film from radiation exposure. This difference in electrical resistance is subsequently converted into a cumulative exposure dosage value and sent to an appropriate output device.

The actual form of the dosimeter may be a small patch or button, powered by a low cost battery or solar cell.

SUMMARY OF THE INVENTION

The present invention provides a method and apparatus that enables a user to determine the cumulative radiation exposure at any given time. An alarm, visual display or combination of both is incorporated to alert the user when a predetermined level of exposure has been reached. Various adjustments in design may be made to allow for the incorporation of sun protectants, included but not limited to shading and sunscreens containing various sun protection factors.

Accordingly, it is a broad aspect of the present invention to provide a personal dosimeter for detection of ultraviolet light or irradiation exposure that allows the user to determine cumulative exposure and total dosage over a period of time.

A further object of the invention is to provide a dosimeter which functions through the photo-dissolution of a metal-containing film on a chalcogenide glass upon exposure to electromagnetic waves of the correct wavelength. Adjustment in the type of metal, contained within the metal-containing film and in the chalcogenide composition, can be incorporated so the film will be wavelength selective.

A further object of the invention is to provide a dosimeter capable of being economically mass produced through spray-deposition of the chalcogenide and the metal-containing film on a large plastic sheet which is subsequently cut to final size.

A further object of the invention is to provide for a dosimeter which incorporates a means for measuring the change in electrical resistance of the exposed portion of the metal-containing film and the unexposed, shielded portion of the metal-containing film. An exposure dosage based on the change in electrical resistance is calculated and output in the form of a cumulative exposure dosage value.

A further object of the invention is to provide an exposure dosage output device capable of alerting the user, through visual display or audible alarm, upon attainment of a specific cumulative total dosage.

A still further object of the invention is to provide for a dosimeter which takes the form of a small individual user embodiment capable of being affixed directly onto the skin of the user or on or under clothing. The instrument may be skin type selective and is capable of providing an accurate exposure reading through the allowance of direct application of skin protectants or sunblocks to the dosimeter surface.

These and other objects, features and advantages of the present invention will become more apparent to those skilled in the art from the following more detailed description of the preferred embodiments of the invention taken with reference to the accompanying Figures.

DETAILED DESCRIPTION OF THE PREFERRED EMBODIMENT

The present invention, as illustrated in the accompanying Figures, is based upon the measurement of cumulative radiation exposure through the process of photo-dissolution. The process involves the exposing of a thin layer of metal-containing film, applied to a chalcogenide glass, to ultraviolet radiation or various other forms of short wavelength electromagnetic radiation. The process results in an irreversible, measurable change in the electrical resistance of the metal-containing film which is ultimately displayed through the use of a differential amplifier integrated circuit. The metal-containing film contains a shielded portion and an unshielded portion which is capable of being exposed to radiation. To determine actual exposure to the radiation, a power source is incorporated into the instrument to deliver a current through the metal-containing film, thus creating a measurable resistance. The electrical resistance is measured between the exposed area, the unshielded portion, and the dark area, the shielded portion of the metal-containing film. The difference in electrical resistance between the two areas is then interpreted into a cumulative exposure dosage value. The differential amplifier is connected to an appropriate output device such as a digital display, an analog meter, a piezo electric beeper, etc. allowing the user to obtain the total cumulative dosage as measured and interpreted. The power source for the dosimeter may be in the form of a low-cost battery such as a lithium battery or a nickel-cadmium battery, a solar cell, or a thermal source.

Figure 1:
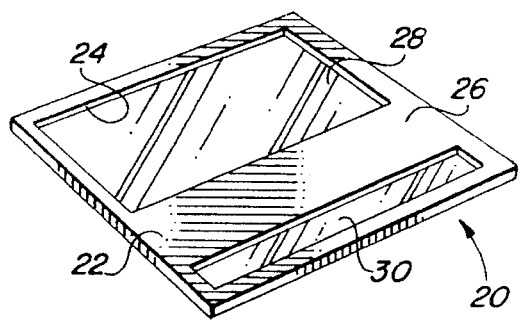
FIG. 1 is a perspective view of the preferred embodiment of the dosimeter according to the present invention.
Figure 2:
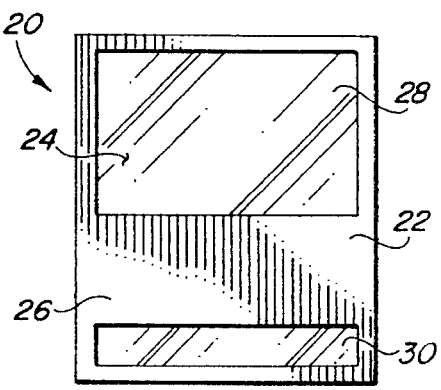
FIG. 2 is a plan view of the preferred embodiment of the dosimeter according to the present invention.
Figure 3:
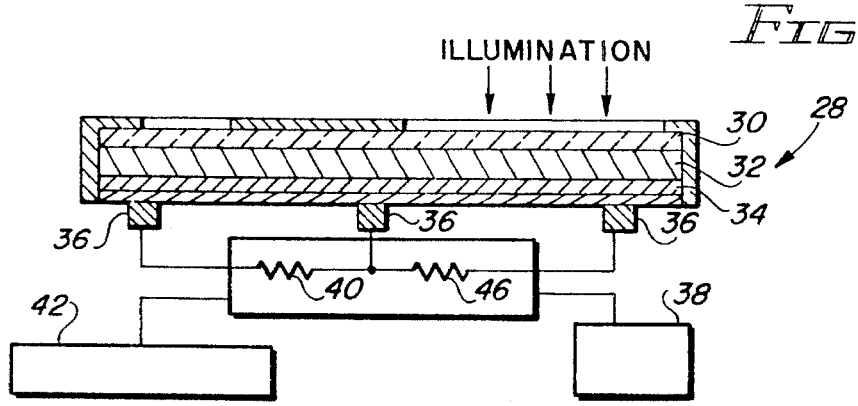
FIG. 3 is a schematic diagram showing the electronic circuitry and elements of the preferred dosimeter according to the present invention.

Turning to the accompanying Figures, and with particular reference to FIGS. 1 and 2, there is shown a preferred embodiment of the dosimeter. Dosimeter 20 includes a protective covering 22 formed in such a manner as to allow for passage of light and irradiation to a first portion of enclosed light sensitive layered material 28 through opening 24 and to act as a shield 26 from light and irradiation to a second portion of enclosed light sensitive layered material 28. A second opening 30 is formed in protective covering 22 for display of total cumulative dosage information in the form of a display and/or alarm capable of alerting user when a level of cumulative dosage has been reached. FIG. 3 illustrates in schematic block form the composition of layered material 28 and electric circuitry elements. Layered material 28 is comprised of transparent substrate 30 on which a chalcogenide layer 32 is applied prior to application of metal-containing film layer 34. Metal-containing film layer 34 can be comprised of various Group I or II metals and is preferably selected from the group consisting of gold, silver, copper and zinc. The chalcogenide material is preferably selected from the group consisting of arsenic, germanium, selenium, tellurium, bismuth, nickel, sulfur, polonium or zinc. Adjustment of the type of metal used in the metal-containing layer and of the chalcogenide makeup, can be made to incorporate different light and irradiation wavelength sensitivities. Electrical contacts 36, positioned on metal-containing film layer 34, allow for the incorporation of a means for measuring the change in electrical resistance between the exposed first portion and shielded second portion of the layered material 28. Power source 38 supplies the necessary power through the metal-containing film for measurement of the electric resistance created in the metal-containing film. Output device 42 in the form of a display and/or alarm is utilized in conjunction with the electrical circuitry to supply information to the user. Output device 42 may be in the form of a visual output or an audible output such as, a piezo electric beeper, a liquid crystal display or combination thereof.

Figure 4:
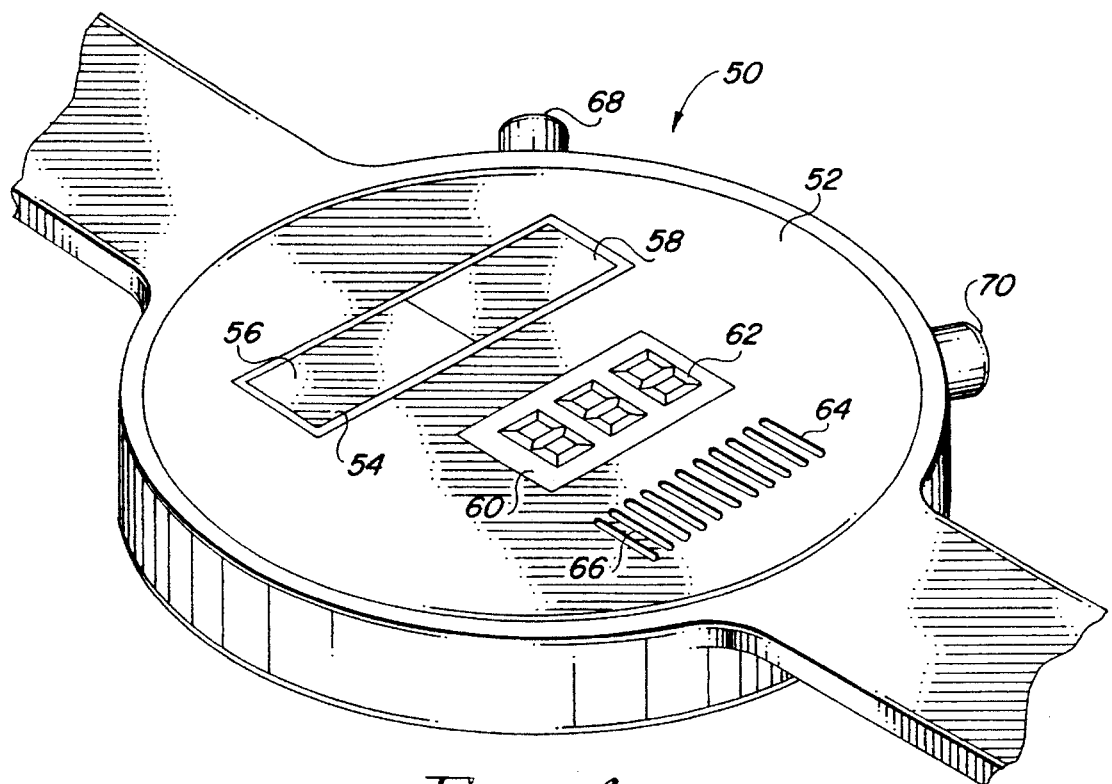
FIG. 4 is an alternative embodiment of the dosimeter according to the present invention.

FIG. 4 shows an alternative embodiment of the present invention. Dosimeter 50 includes a protective covering 52 formed in such a manner as to allow for passage of light and irradiation to a first portion of enclosed light sensitive layered material 54 through opening 56 and to act as a shield 58 from light and irradiation to a second portion of enclosed light sensitive layered material 54. A second opening 60 is formed in protective covering 52 for display of total cumulative dosage information in the form of a display 62. A third opening 64 is formed in protective covering 52 for an alarm speaker 66 capable of alerting user when a level of cumulative dosage has been reached. A first button 68 is formed on the side of the dosimeter 50 to eject the layered material 54. A second button 70 is formed on the side of the dosimeter 50 to turn the display on/off.

Figure 5:
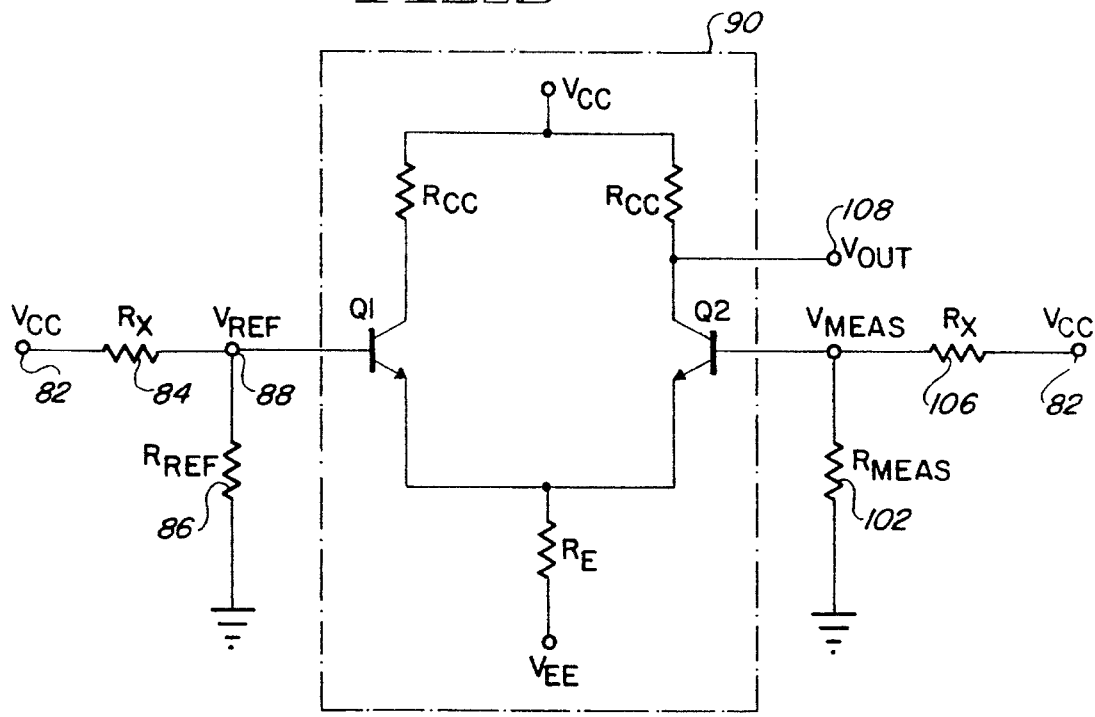
FIG. 5 illustrates in block diagram form the electronic elements and circuits of the dosimeter according to the present invention.

FIG. 5 illustrates the circuit diagram 80 which measures the difference in resistivity between the protective covering 22 and the layered material 28 (See FIG. 1). The reference voltage 88 is established by applying the battery voltage 82 across the resistance combination 84 and 86. The measured voltage 104 is established by applying the battery voltage 82 across resistive combination 102 and 106. Output voltage 108 is established and amplified by the differential amplifier 90 subtracting the reference voltage 88 and the measured voltage 104.

Figure 6:
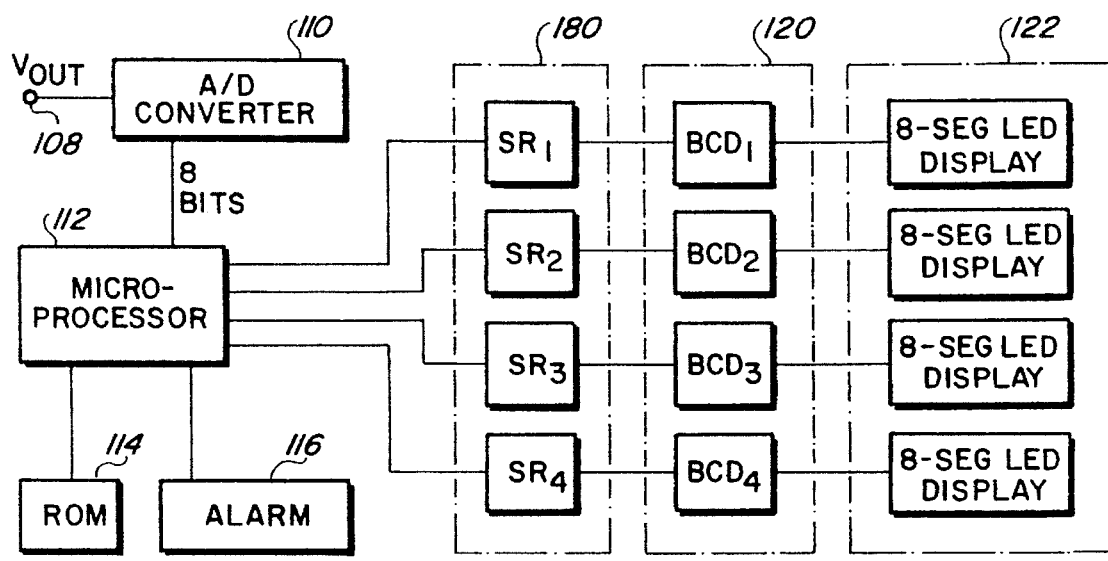
FIG. 6 illustrates a flow diagram showing the process by which the output voltage is converted into a LED display.

FIG. 6 illustrates a flow diagram that shows the process by which the output voltage is converted into a four-digit LED display. Output voltage 108 feeds an Analog-In 8-bit Digital Word-Out Convertor 110. The 8-bit output of the Analog-to-Digital Convertor 110 feeds into a microprocessor 112. The microprocessor 112 converts the 8-bit word into four 8-bit words using the information contained in ROM 114. Each of the four 8-bit words is fed into a serial-in parallel-out shift register 118. The 8-bit output of the shift registers 118 feeds into a binary coded decimal device 120 which converts the digital representation of the output voltage 108 into a format suitable for the eight segment display 122. The 8-bit output of the binary coded decimal device 120 feeds the eight segment LED display 122 which illuminates the appropriate segments to form the four digit display. When the microprocessor 112 reaches a threshold value, it will also activate the alarm 116.

In accordance with the preferred embodiment of the present invention, a particular combination of arsenic sulfide compound chalcogenide and elemental silver containing film have been chosen due to its combined ability to resist thermal diffusion when used to measure ultraviolet radiation exposure. Various other combinations of metal and chalcogens may be used dependent on type of radiation exposure sought to be measured.

During exposure, the silver of the metal-containing film ionically diffuses into the arsenic sulfide chalcogenide layer with minimal lateral spread. The mechanics of the silver photodissolution produces an edge-sharpening effect which yields a practical contrast value between the electrical resistance of the exposed portion of the metal-containing film and the shielded portion of the metal-containing film. The change in resistance between the exposed and shielded portions of the metal-containing film is thus able to be measured and converted to a cumulative dosage exposure value based on dermatological recommended dosage amounts.

Thus, there has been described with reference to the preferred embodiment and the best mode contemplated for the invention, an improved instrument for determining personal cumulative dosage exposure to ultraviolet radiation or other forms of short wavelength electromagnetic radiation. The instrument is based on the mechanics of the process of photo-dissolution in connection with an differential amplifier integrated circuit means for measuring and outputting the dosage information. Unlike the previously available personal dosimeters, the present invention combines the degree of change in electrical resistance of a shielded and unshielded portion of a metal-containing film, an irreversible effect, with the ability to output information, through the use of a differential amplifier integrated circuit and output device.

Those skilled in the art will understand and appreciate that other embodiments utilizing the present means for formation of cumulative dosage information may yet be determined. The present invention has been described according to its preferred embodiment. Those skilled in the art will recognize that the invention is not limited to the specifics as shown here, but is claimed in any form or modification falling within the scope of the appended claims.

What is claimed:

1. A dosimeter comprising:

a transparent substrate, said substrate comprised of a non-conducting material incapable of creating a measurable electrical resistance;

a chalcogenide layer bonded directly to said transparent substrate in a layering manner;

a metal-containing film bonded directly to said chalcogenide material in a layering manner so as to cumulatively form a layered light sensitive material;

a protective covering having said light sensitive layered material substantially enclosed within, said protective covering capable of exposing a first portion of said light sensitive material and shielding a second portion of said light sensitive material from exposure;

a power source for creation of a current through said metal-containing film;

means for measuring a change in electrical resistance of said metal-containing film;

means for converting said change in electrical resistance of said metal-containing film to a cumulative exposure dosage value; and means for outputting said cumulative exposure dosage value.

2. The dosimeter according to claim 1, wherein said metal-containing film is selected from the group consisting of silver, gold, copper and zinc.

3. The dosimeter according to claim 1, wherein said chalcogenide material is selected from the group consisting of arsenic, germanium, selenium, tellurium, bismuth, nickel, sulphur, polonium and zinc.

4. The dosimeter according to claim 1, wherein said power source is selected from the group consisting of a lithium battery, a solar cell, a nickel cadmium battery and thermal sources.

5. The dosimeter according to claim 1, wherein said means for measuring a change in electrical resistance of said metal-containing film is comprised of a differential amplifier integrated circuit capable of measuring the difference between the electrical resistance of the metal containing film of the exposed first portion of said light sensitive material and the electrical resistance of the metal containing film of the shielded second portion of said light sensitive material.

6. The dosimeter according to claim 1, wherein said means for outputting said cumulative dosage value to a user is comprised of a visual display.

7. The dosimeter according to claim 6, wherein said visual display further comprises a liquid crystal display.

8. The dosimeter according to claim 1, wherein said means for outputting said cumulative dosage value to a user is comprised of an audible alarm.

9. The dosimeter according to claim 8, wherein said audible alarm further comprises a piezo electric beeper.

10. The dosimeter according to claim 1, wherein said means for outputting said cumulative dosage value to a user is comprised of a combination visual display and audible alarm.

11. A method for forming and using a multi-layer dosimeter, comprising the steps of:

depositing a chalcogenide layer onto a substrate;

depositing a metal-containing film, onto the surface of the chalcogenide layer to form a layered light sensitive material;

cutting said light sensitive material into predetermined sizes;

substantially enclosing said material in a protective covering capable of exposing a first portion of said light sensitive material and shielding a second portion of said light sensitive material;

exposing said light sensitive material, thereby passing an exposed portion of said metal-containing layer into said chalcogenide layer;

measuring a change in electrical resistance between the metal containing film of the exposed first portion of said light sensitive material and the metal containing film of the shielded second portion of said light sensitive material;

converting said change in electrical resistance to a cumulative exposure dosage value; and outputting said cumulative exposure dosage value.

12. The method according to claim 11, wherein said chalcogenide layer is selected from the group consisting of arsenic germanium, selenium, tellurium, bismuth, nickel, sulphur and zinc.

13. The method according to claim 11, wherein said metal-containing film layer is selected from the group consisting of silver, gold, copper, and zinc.

14. The method according to claim 11, wherein said step of measuring said change in electrical resistance is performed by a differential amplifier integrated circuit.

15. The method according to claim 11, wherein said step of measuring said change in electrical resistance is performed by a level sensing device.

16. The method according to claim 11, wherein said step of outputting said cumulative exposure dosage value is performed by an audible alarm.

17. The method according to claim 11, wherein said step of outputting said cumulative exposure dosage value is performed by a visual alarm.

18. The method according to claim 11, wherein said step of outputting said cumulative exposure dosage value is performed by a combination audible and visual alarm.

* * * * *